March 29, 1932. H. S. HOLMES 1,851,184
TRANSFORMER
Filed Nov. 9, 1928 2 Sheets-Sheet 1
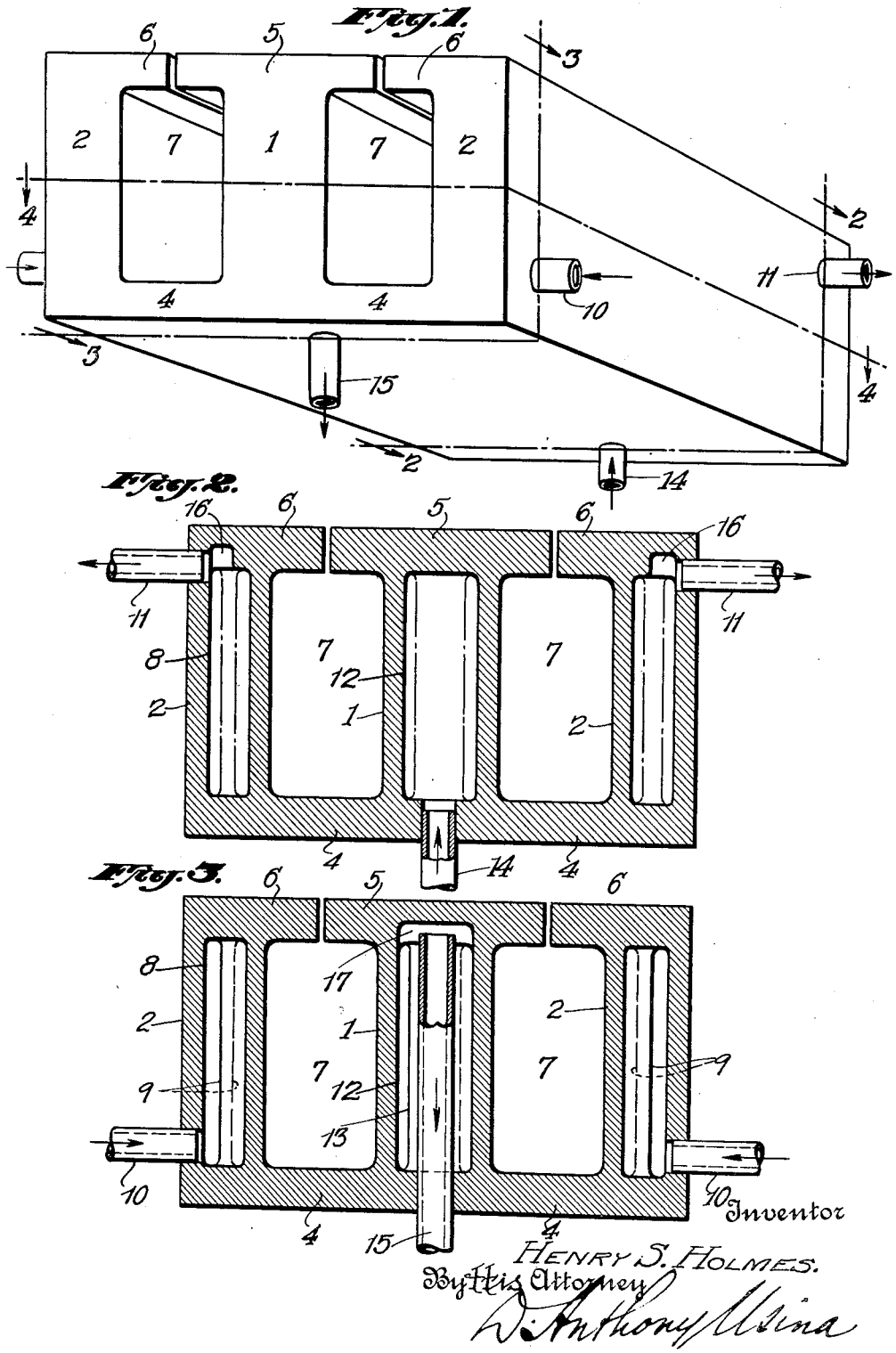
Inventor
HENRY S. HOLMES.
By his Attorney
D. Anthony Usina March 29, 1932.  H. S. HOLMES  1,851,184

TRANSFORMER

Filed Nov. 9, 1928   2 Sheets-Sheet 2

Inventor
HENRY S. HOLMES.
By his Attorney

Patented Mar. 29, 1932

1,851,184

UNITED STATES PATENT OFFICE

HENRY S. HOLMES, OF BROOKLYN, NEW YORK, ASSIGNOR, BY MESNE ASSIGNMENTS, TO METROPOLITAN ENGINEERING COMPANY, A CORPORATION OF NEW YORK

TRANSFORMER

Application filed November 9, 1928. Serial No. 318,140.

This invention relates to a means for cooling the secondary of a welding transformer. The objects of the invention are to provide extended surfaces for the transfer of heat from the metal of the secondary to a current of water or cooling fluid; and to provide such extended surfaces in such a manner as to strengthen the secondary against welding stresses.

Fig. 1 is a perspective view of a secondary winding of a welding machine transformer;

Figs. 2 and 3 are vertical cross sections on the planes 2—2 and 3—3 respectively of Fig. 1.

Figure 4:
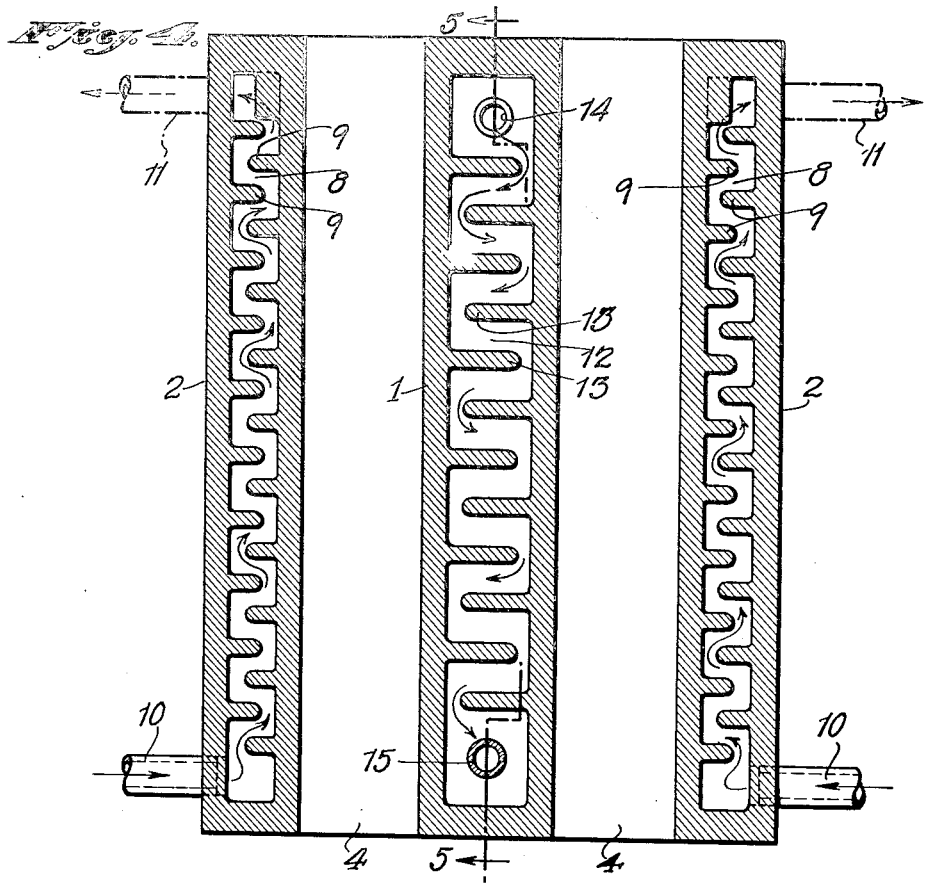
Fig. 4 is a horizontal section on the line 4—4 of Fig. 1.
Figure 5:
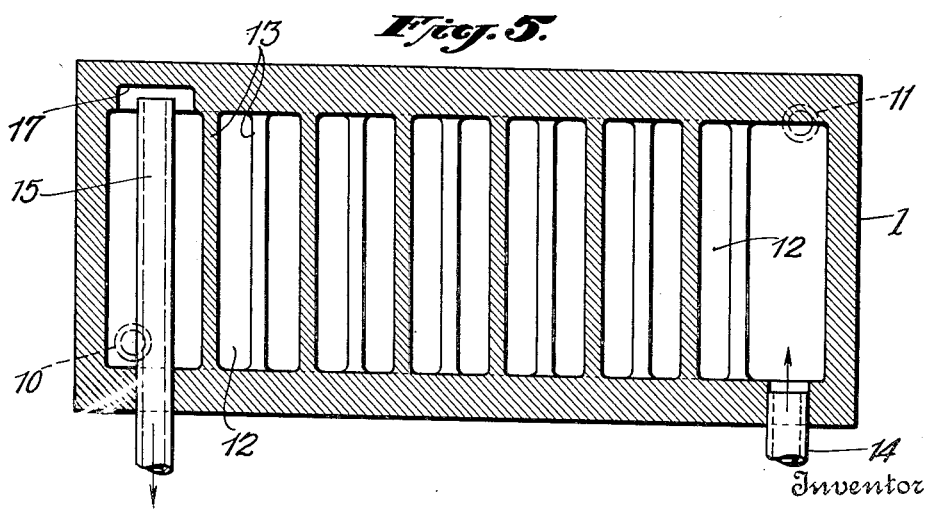
Fig. 5 is a vertical longitudinal section on the line 5—5 of Fig. 4.

The secondary has a central member 1 and side members 2. These three parts are connected together continuously by bottom members 4. The central member has a pole piece 5 which extends laterally in both directions nearly to the inwardly extending pole pieces 6 of the members 2. The upper wall of the pole piece 5 supports an electrode through which current and pressure are applied as shown, for example, in Murray Patent 1,320,894, the stresses of the electrode being received directly on the pole piece. In the openings 7 there are placed the primary winding and the iron core of the transformer, said core enclosing the member 1. Such transformer secondaries usually consist of a cast copper or a fabricated copper conductor with cooling chambers or hollow sections therein for the passage of a cooling fluid.

In the present improvement the walls of these chambers are provided with extended areas or fins projecting into the chambers, thus securing an increased transfer of heat from the conductor to the cooling fluid. The side members 2 are hollow so as to provide a chamber 8 and have integral vertical fins or ribs 9 projecting inward from the walls of the chamber and preferably slightly overlapping as well as staggered. The cooling fluid is admitted through a pipe 10 at the bottom of one end and discharged through a pipe 11 at the top of the opposite end.

The central member 1 is wider than the end members. The walls surrounding the hollow chamber 12 are of about the same thickness as for the end members, leaving a wider chamber. The integral fins or ribs 13 are of greater width than for the side members, providing a very much greater area exposed to the cooling fluid. The fins or ribs 13 extend vertically in the direction of passage of current through the chamber 12 and in a direction to receive the stresses imposed on the central member 1 when the latter is subjected to welding pressure. Thus the fins 13 serve to strengthen the central member 1 and prevent the chamber 12 from being crushed or enable a larger chamber 12 to be provided than would otherwise be possible. Moreover, as the fins 13 extend in the path of the current, they serve to lessen the resistance of the central member. Any heat generated in these ribs by the passage of current is transferred directly to the cooling fluid with a minimum path through the metal. This is important because the central member carries twice the current of the individual side members and is more liable to overheating than the side members. The water or air or other fluid is circulated through the central member in the opposite longitudinal direction from that in which it circulates through the side members. The admission pipe 14 and the discharge pipe 15 enter through the bottom of the transformer. The base portions 4 and the top portions 5 and 6 can also be made hollow with or without the extended area provided by the internal ribs; though ordinarily it will be sufficient to cool the arms or members 1 and 2. Water or other cooling fluid is forced in through the pipes 10 at what we may call the front end and the pipe 14 at the rear end, and is discharged through the pipes 11 at the rear and 15 at the front.

In order to ensure that the cooling fluid, if it is a liquid, shall always fill the chamber, pockets 16 are provided in the side members and a pocket 17 in the central member above the top of the chamber, and the discharge passages lead out of these pockets. In this way the filling of the chamber with the liquid is ensured.

Various modifications can be made by those skilled in the art without departing from the invention as defined in the following claims.

What I claim is:

1. A secondary for an electric transformer comprising a current conducting and pole supporting member, a cooling chamber extending through said member below said pole piece, and projections in said chamber providing extended surfaces for the transfer of heat from a fluid in said chamber to the walls thereof and extending in the direction of the passage of current and the stresses from said pole piece.

2. A secondary for an electric transformer comprising a current conducting member having recesses for receiving primary windings, an inner cooling chamber, means for supplying a cooling fluid to one part of said chamber and withdrawing it from another, and heat exchanging baffles in said chamber extending in the direction of the current induced by primary windings from one wall of said chamber to the other.

3. A secondary for an electric transformer comprising a current conducting member having recesses for receiving primary windings, an inner lengthwise extending cooling chamber and having an inlet at one end and an outlet at the other and heat exchanging ribs extending from the side walls of said cooling chamber inwardly in planes parallel to the direction of induced current and extending from one wall to the other.

4. A secondary for an electric transformer comprising a current conducting member having recesses for receiving primary windings, an inner lengthwise extending cooling chamber and having an inlet at one end and an outlet at the other and heat exchanging ribs extending alternately in staggered relation from opposite side walls of said chamber and extending in the direction of inducing currents in said secondary.

In witness whereof, I have hereunto signed my name.

HENRY S. HOLMES.